(12) United States Patent
Murphy et al.

(10) Patent No.: US 7,017,448 B2
(45) Date of Patent: Mar. 28, 2006

(54) PRECISION HAND-HELD WIRE STRIPPER

(75) Inventors: Stacey A. Murphy, DeKalb, IL (US); Edward T. Eaton, Wheaton, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 10/830,588

(22) Filed: Apr. 23, 2004

(65) Prior Publication Data

US 2005/0235778 A1    Oct. 27, 2005

(51) Int. Cl.
*H02G 1/12* (2006.01)

(52) U.S. Cl. .......................... 81/9.43; 81/9.42; 81/9.41

(58) Field of Classification Search ................. 81/9.43, 81/9.42, 9.41, 347, 352, 355, 419, 421
See application file for complete search history.

(56) References Cited

U.S. PATENT DOCUMENTS

| | | | | |
|---|---|---|---|---|
| 2,523,936 A | | 9/1950 | Axelsen | |
| 3,221,576 A | * | 12/1965 | Goetz | 81/9.43 |
| 5,491,894 A | * | 2/1996 | Bieganski | 30/90.1 |
| 5,500,998 A | * | 3/1996 | Schmode et al. | 29/751 |
| 5,724,871 A | * | 3/1998 | Wall | 81/9.43 |
| 6,079,296 A | * | 6/2000 | Muromoto | 81/9.43 |
| 6,324,712 B1 | * | 12/2001 | Elsener, Sr. | 7/132 |
| 6,718,848 B1 | * | 4/2004 | Liversidge | 81/9.42 |

* cited by examiner

*Primary Examiner*—Lee D. Wilson
*Assistant Examiner*—Alvin J. Grant
(74) *Attorney, Agent, or Firm*—Cook,Alex,McFarron,Manzo,Cummings & Mehler, Ltd.

(57) ABSTRACT

A wire stripper has a blade handle, a gripper handle, a blade jaw and a gripper jaw all pivotally connected at a main pivot pin that is offset from the mating faces of the jaws. Movable and floating cutting blades mounted on the blade jaw are self-aligning due to a floating connection of the blades that allows them to move respective gauge surfaces into engagement during closing. A blade hold down spring urges the blades into alignment. The jaws are angled with respect to the handle axis so the throat of the cutting blades aligns with a user's line of sight. Individual handle springs have differential springs rates and are arranged so that the handles springs do no resist opening of the jaws.

39 Claims, 14 Drawing Sheets

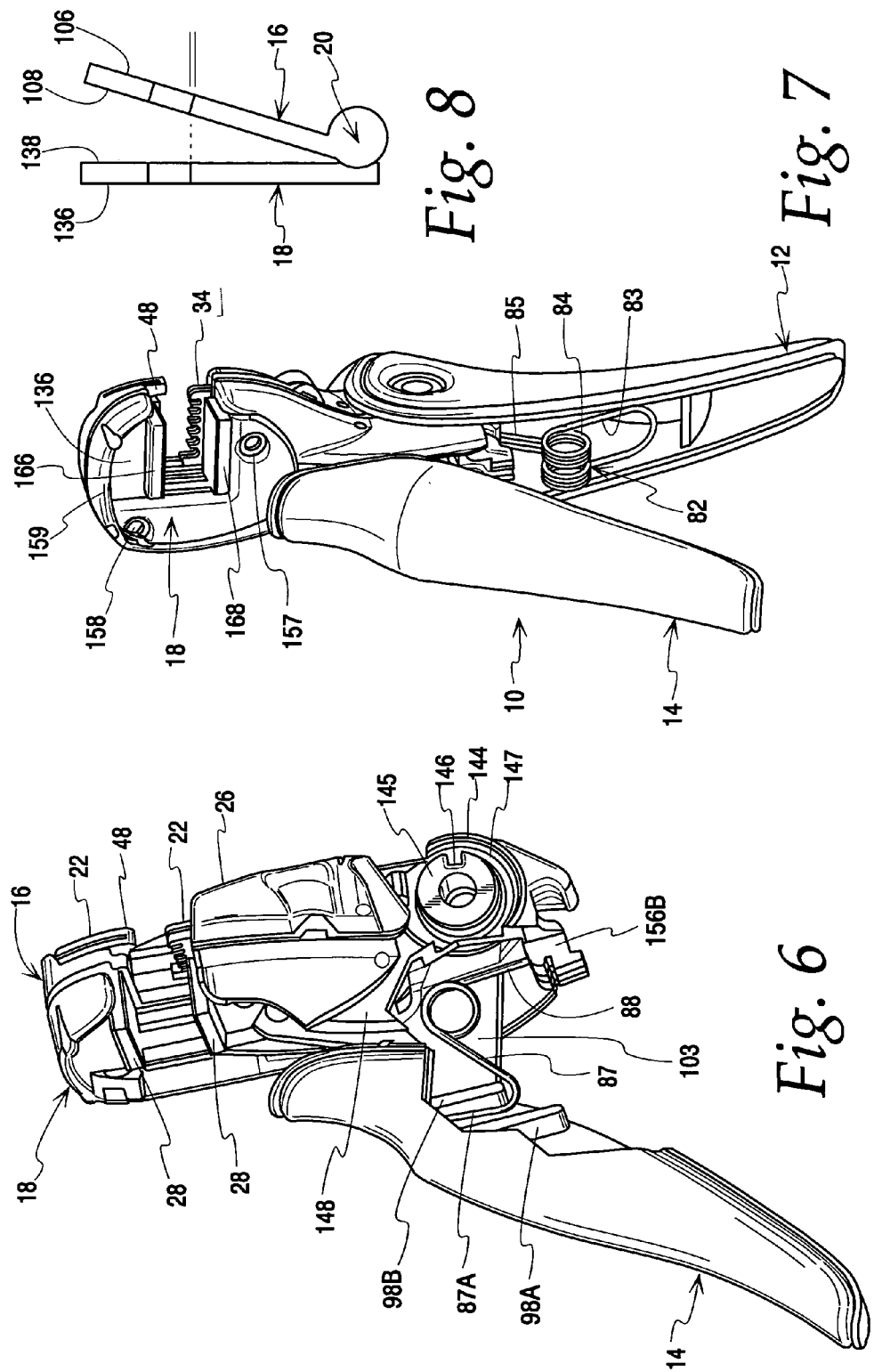

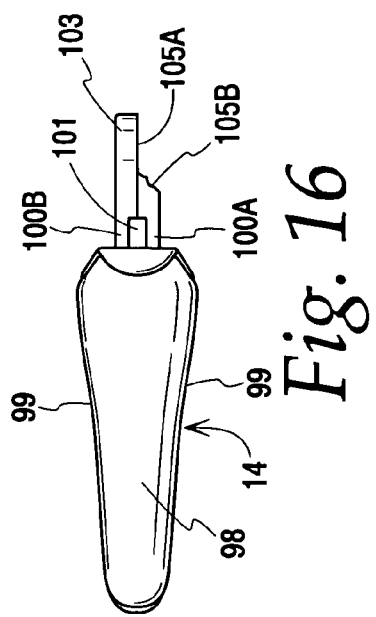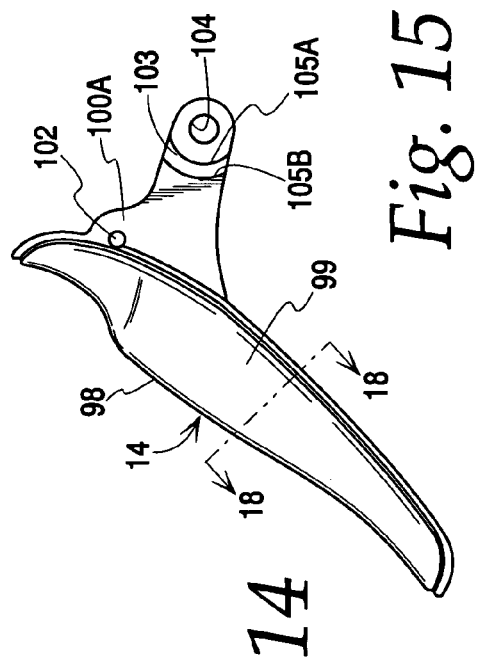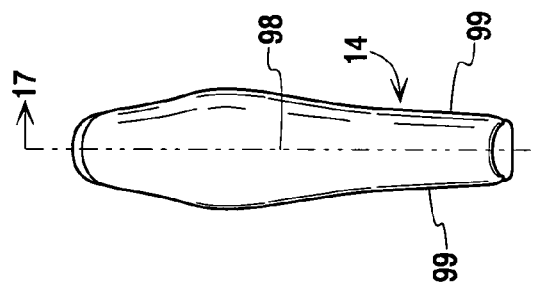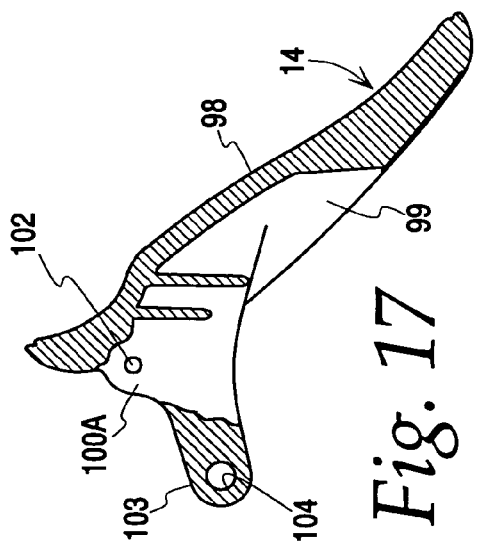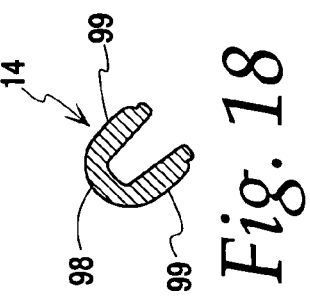

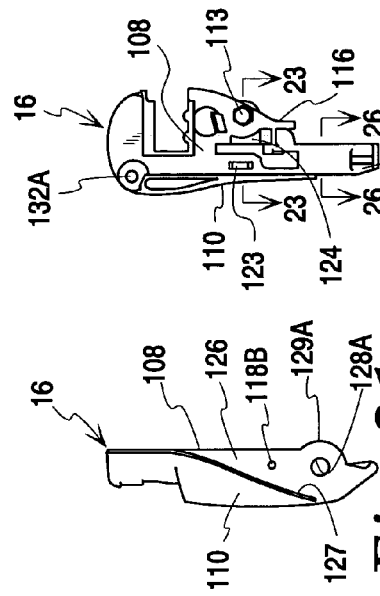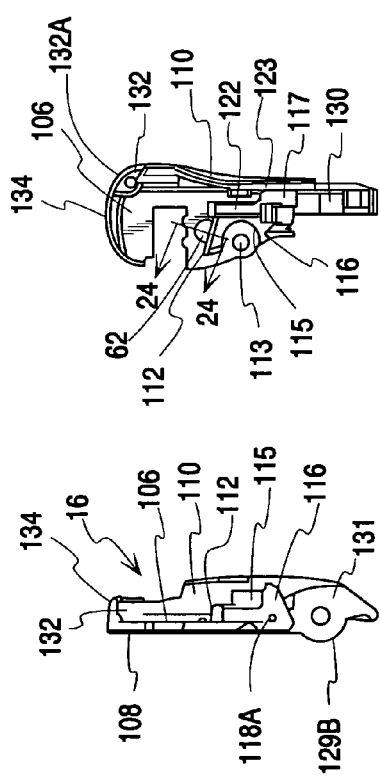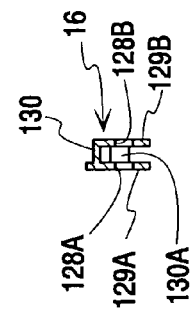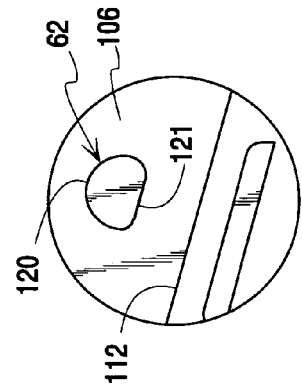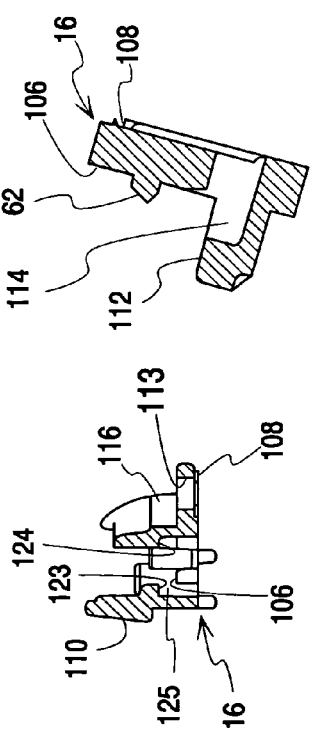

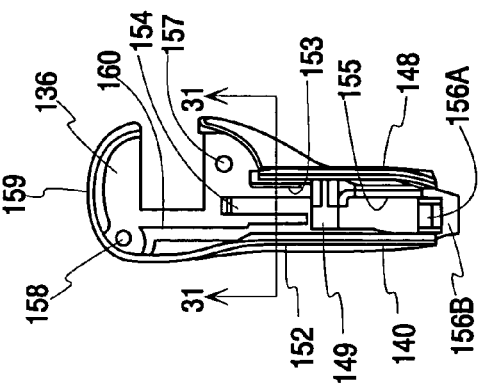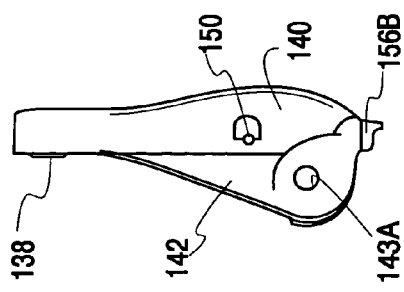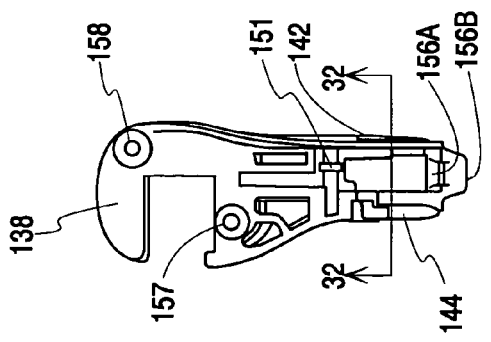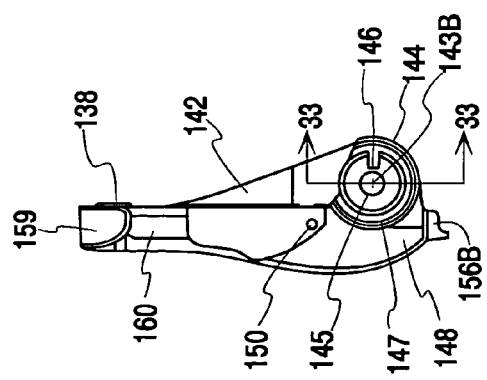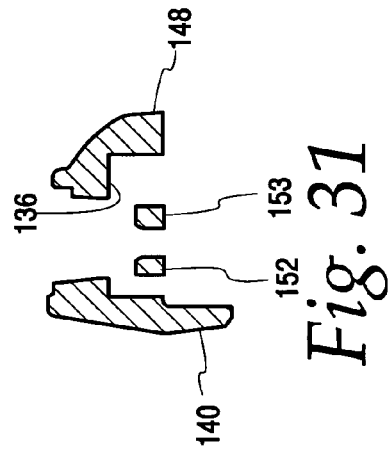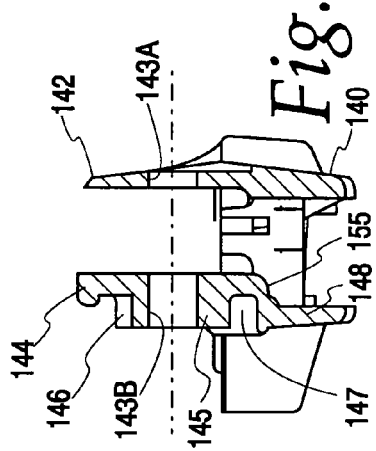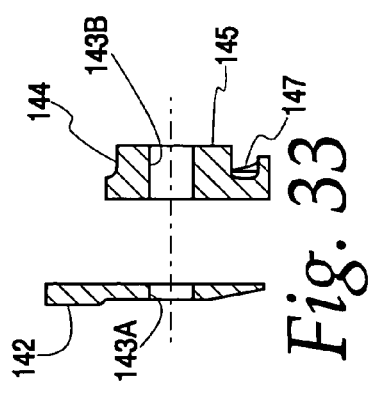

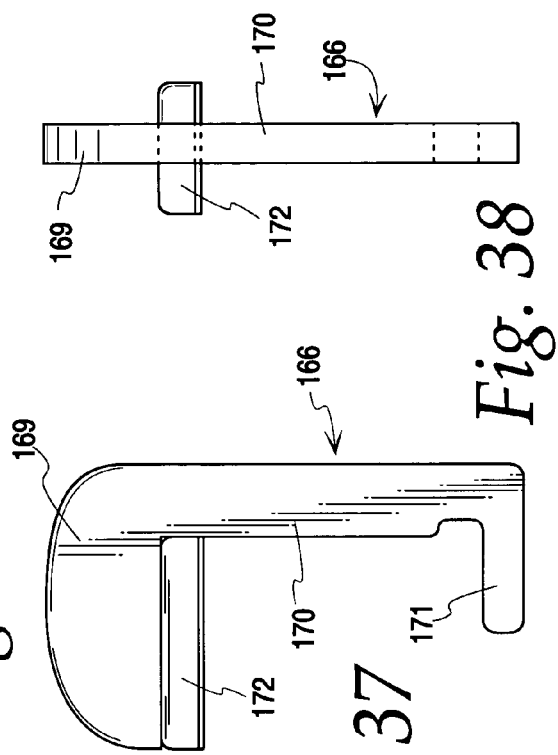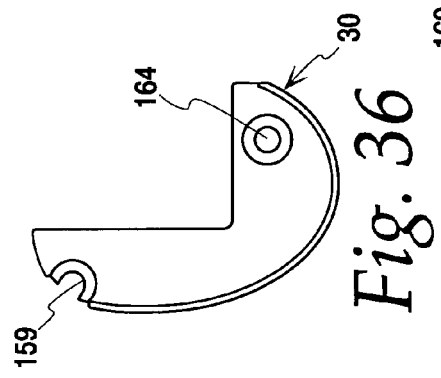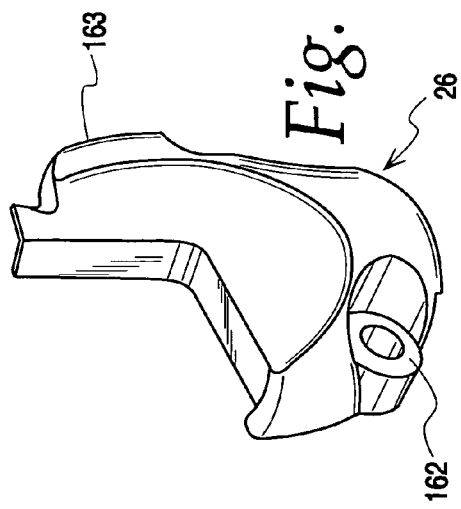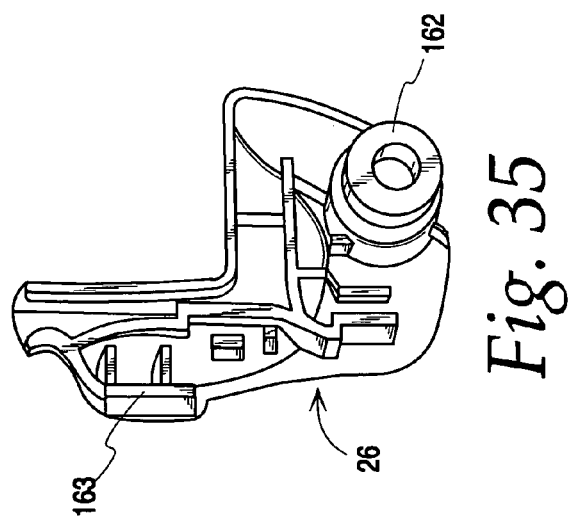

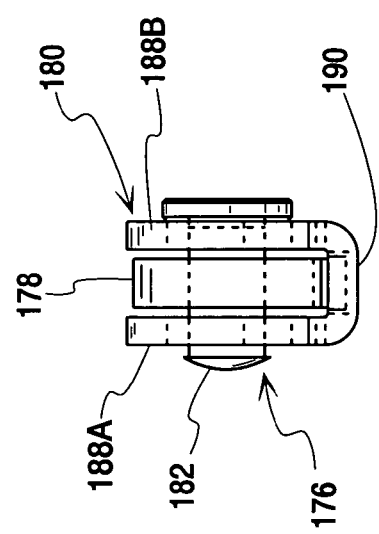
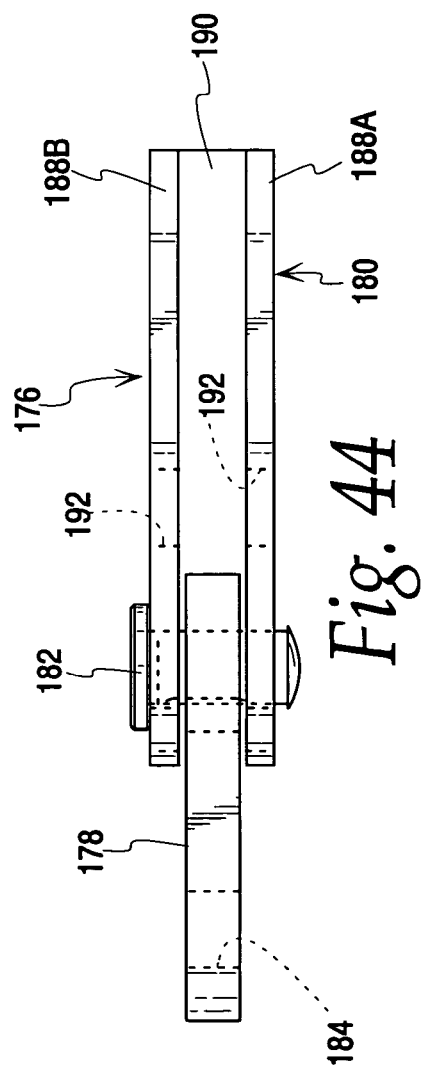
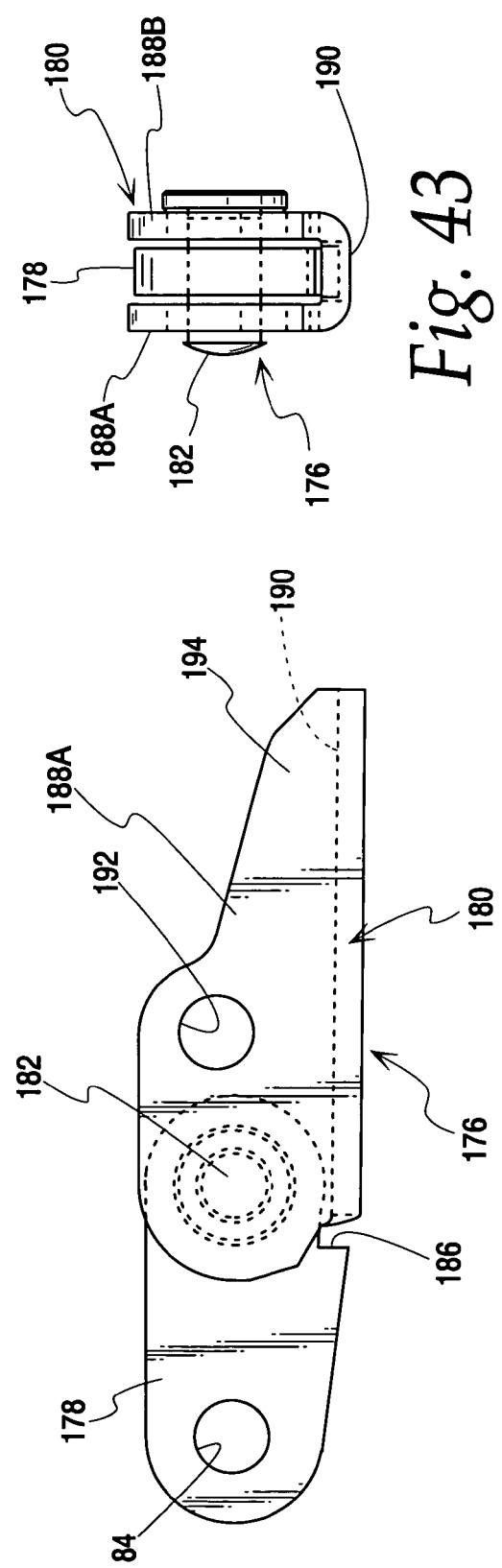

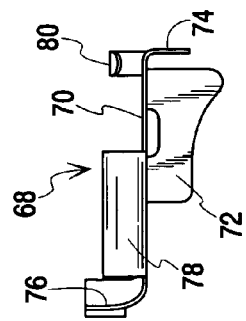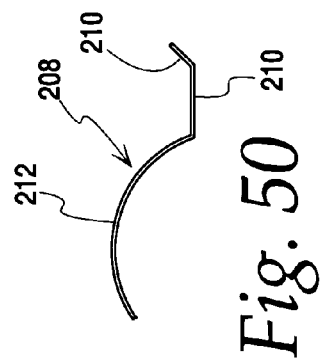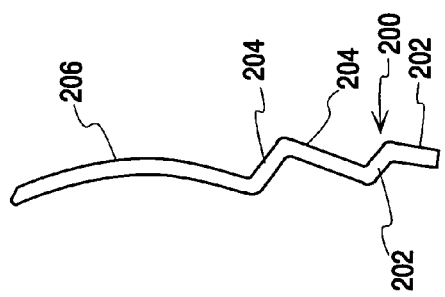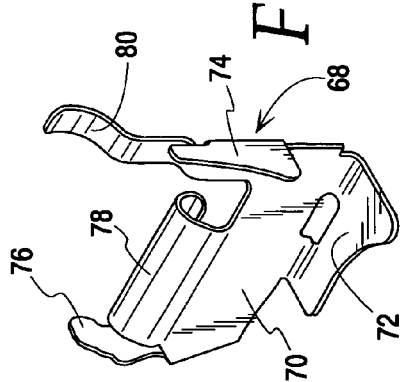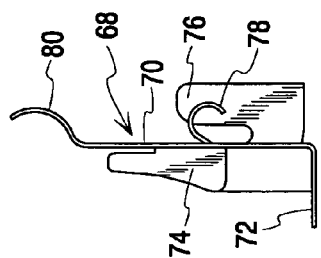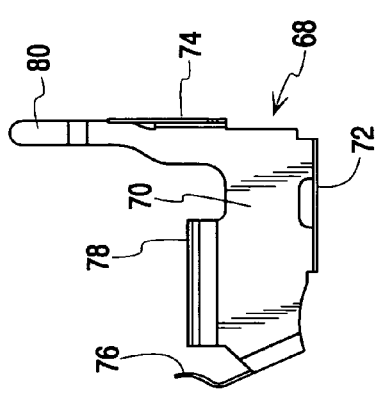

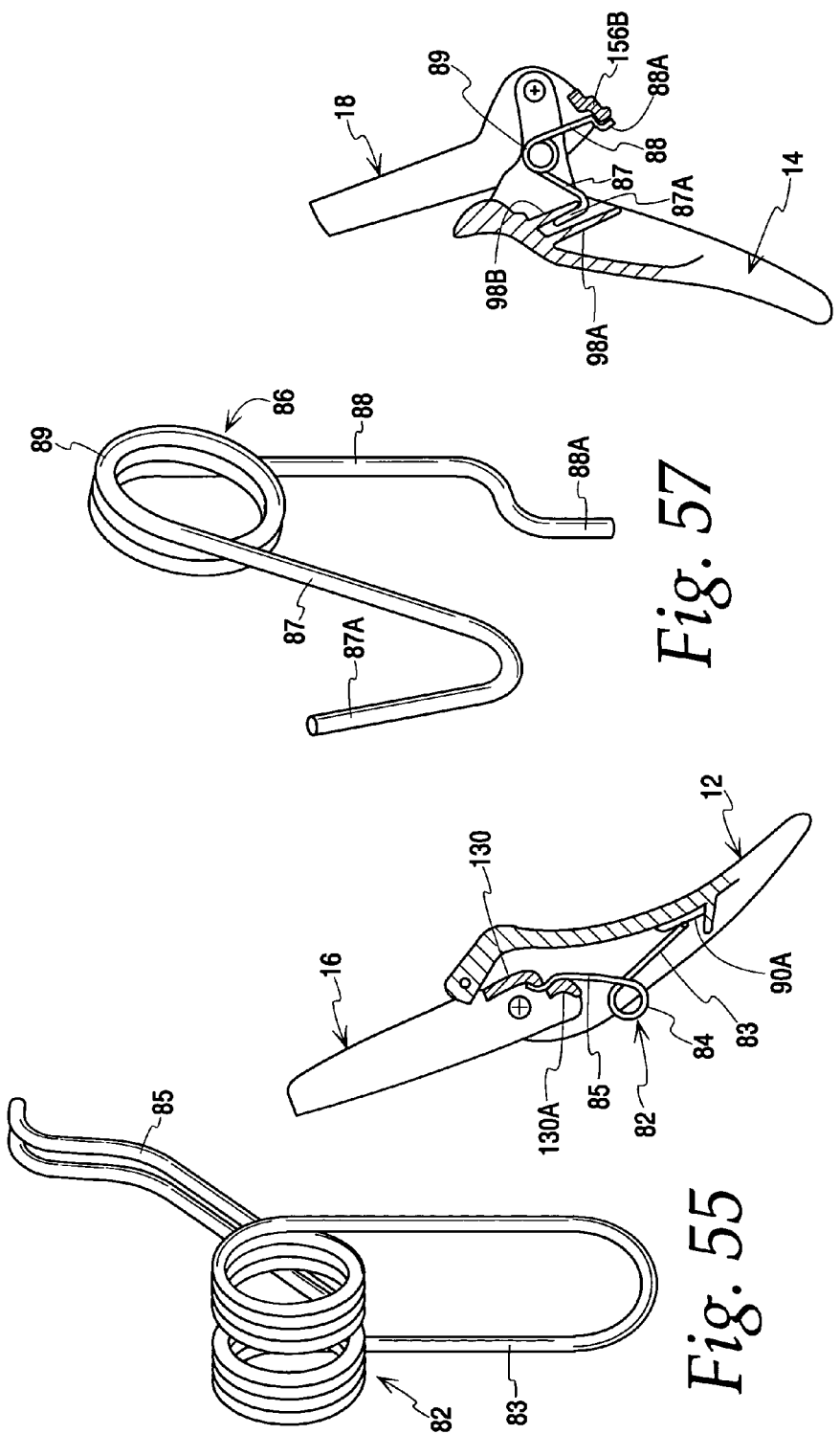

PRECISION HAND-HELD WIRE STRIPPER

BACKGROUND OF THE INVENTION

This invention is a hand-held wire stripper. In particular, the invention concerns a wire stripper which has a set of reciprocating jaws on which are mounted reciprocating wire stripper blades. Tools of this type provide an action in which the blades close on the end of a wire to cut its insulation and form an insulation slug to be pulled off the end of the wire. After the slug is cut the jaws separate in a direction generally parallel to the wire to pull the insulation slug off the conductor. This is followed by the blades opening to release the wire and by the jaws reclosing to prepare for the next cycle of operation. Typically wire strippers of this type also have a set of reciprocating grippers mounted on the jaws and which move generally in tandem with the blades to close on the unstripped portion of the wire and hold it fixed while the slug is pulled off. An example of a wire stripper of this type is shown in U.S. Pat. No. 2,523,936, the disclosure of which is incorporated herein by reference.

The present invention is directed to a wire stripper of the type described which is intended for use in a high-volume, high-precision production environment, such as the aerospace industry, although it is not limited to such use. In this type of application the stripping specifications demand that the copper or other metal conductor of the wire cannot be nicked during the stripping process. Neither can the insulation be torn, stretched or shredded at the cut line; it must be cut through cleanly but without nicking the metal conductor. Thus arises the need for high precision. Also, the repetitive nature of the work requires a tool of sound ergonomic design that minimizes radial or linear deviation of the user's wrist. That is, the tool should permit the user to maintain a neutral wrist position, not one that is cocked or tilted. It is also desirable that the tool be as light as possible while also being able to withstand the rigors of continual use. Ease of use can also be increased by minimizing the squeezing force required of the users to effect the full cycle of the tool. Prior art wire strippers leave room for improvement in all of these areas.

SUMMARY OF THE INVENTION

The present invention is directed to a hand-held wire stripper having reciprocating cutting blades mounted on reciprocating jaws with the jaws and at least one of the blades being connected to handles for actuation. A primary object of the invention is a wire stripper of the type described which provides highly precise insulation cutting that avoids nicking the metal conductor of a wire. Increased precision results from self-aligning laminated cutting blades, a latching blade hold-down cover with an integrated spring, and a main pivot joint that is offset from the separation line of the jaws.

The self-aligning blade set includes a movable blade and a floating blade. The movable blade moves up and down on the blade jaw under the influence of a link connected to the blade handle. The floating blade is mounted so as to permit it to move laterally. A tab on the lower edge of the floating blade engages a ledge to prevent rotation of the blade out of its plane. A support surface on the floating blade is angled with respect to the blade movement axis such that a spring in the blade hold-down cover can bias the floating blade toward a leg of the movable blade. A cam on the movable blade engages a cam surface on the floating blade to urge the floating blade toward a leg of the movable blade. The resulting engagement of gauge surfaces on the sides of the floating blade and the movable blade leg aligns the cutting notches of the blades.

Misalignment of the cutting blades and the wire axis due to arcuate motion of the jaws is minimized by offsetting the jaw pivot point from the separation line of the jaws. This further reduces the chances of nicking or damaging the wire during slug removal.

Another object of the invention is a wire stripper of the type described having improved ergonomics derived from lighter weight, reduced actuating force, and an improved jaw orientation that permits repeated use of the tool with a neutral wrist position.

The improved jaw orientation angles the jaws with respect to the centerline of the handles. With the jaw orientation of the present invention the plane of the cutting blades is generally perpendicular to the user's line of sight when the user grasps the tool's handles and the user's wrist is in a neutral position. Accordingly, wires can be threaded into the throat between the blades without cocking the wrist.

Reduced actuating pressure results from the use of precision laminated cutting blades and from individual handle return springs positioned such that they do not resist opening of the jaws. The handle return springs have differential spring rates that ensure proper sequencing of the blade and gripper closing, namely, the blades close first, then the grippers. Lighter weight is achieved by minimizing the number of heavy metal components. The reduced actuating forces involved permit use of carbon-filled polyurethane for the handles and jaws. A unique blade-mounting arrangement permits elimination of heavy metal hold-down plates found in prior art tools.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 6 is a perspective view of the wire stripper with the blade handle removed and portions of the gripper handle and gripper jaw cut away to illustrate the gripper handle spring.

FIG. 7 is a perspective view of the wire stripper illustrating the blade handle spring.

FIG. 8 is a diagrammatic illustration of the offset pivot location of the blade and gripper jaws.

FIG. 14 is a side elevation view of the gripper handle.

FIG. 15 is a front elevation view of the gripper handle.

FIG. 16 is a top plan view of the gripper handle.

FIG. 17 is a section taken along line 17—17 of FIG. 14.

FIG. 18 is a section taken along line 18—18 of FIG. 15.

FIG. 19 is a front elevation view of the blade jaw.

FIG. 20 is a right side elevation view of the blade jaw, showing its mounting face.

FIG. 21 is a rear elevation view of the blade jaw.

FIG. 22 is a left side elevation view of the blade jaw, showing its mating face.

FIG. 23 is a section taken along line 23—23 of FIG. 22.

FIG. 24 is a section taken along line 24—24 of FIG. 20.

FIG. 25 is a front elevation view, on an enlarged scale of the floating blade mounting button.

FIG. 26 is a section taken along line 26—26 of FIG. 22.

FIG. 27 is a front elevation view of the gripper jaw.

FIG. 28 is right side elevation view of the gripper jaw, showing its mating face.

FIG. 29 is a rear elevation view of the gripper jaw.

FIG. 30 is a left side elevation view of the gripper jaw, showing its mounting face.

FIG. 31 is a section, on an enlarged scale, taken along line 31—31 of FIG. 30.

FIG. 32 is section, on an enlarged scale, taken along line 32—32 of FIG. 28.

FIG. 33 is a section, on an enlarged scale, taken along line 33—33 of FIG. 27.

FIG. 34 is a perspective view of the front of the blade cover.

FIG. 35 is a perspective view of the rear of the blade cover.

FIG. 36 is a side elevation view of the gripper cover.

FIG. 37 is a side elevation view of the movable gripper assembly.

FIG. 38 is a rear elevation view of the movable gripper assembly.

FIG. 42 is a front elevation view of the latch assembly.

FIG. 43 is an end elevation view of the latch assembly.

FIG. 44 is a plan view of the latch assembly.

FIG. 45 is a perspective view of the blade hold down spring.

FIG. 46 is a side elevation view of the blade hold down spring.

FIG. 47 is a rear elevation view of the blade hold down spring.

FIG. 48 is a plan view of the blade hold down spring.

FIG. 49 is a side elevation view, on an enlarged scale, of an alternate embodiment of a blade handle spring.

FIG. 50 is a side elevation view of an alternate embodiment of a gripper handle spring.

FIG. 55 is a perspective view of a preferred embodiment of the blade handle spring.

FIG. 56 is a diagrammatic section through the blade handle, the blade jaw, and the blade handle spring of FIG. 55, illustrating the interrelationship of these parts.

FIG. 57 is a perspective view of a preferred embodiment of the gripper handle spring.

FIG. 58 is a diagrammatic section through the gripper handle, the gripper jaw, and the gripper handle spring of FIG. 57, illustrating the interrelationship of these parts.

DETAILED DESCRIPTION OF THE INVENTION

Figure 1:
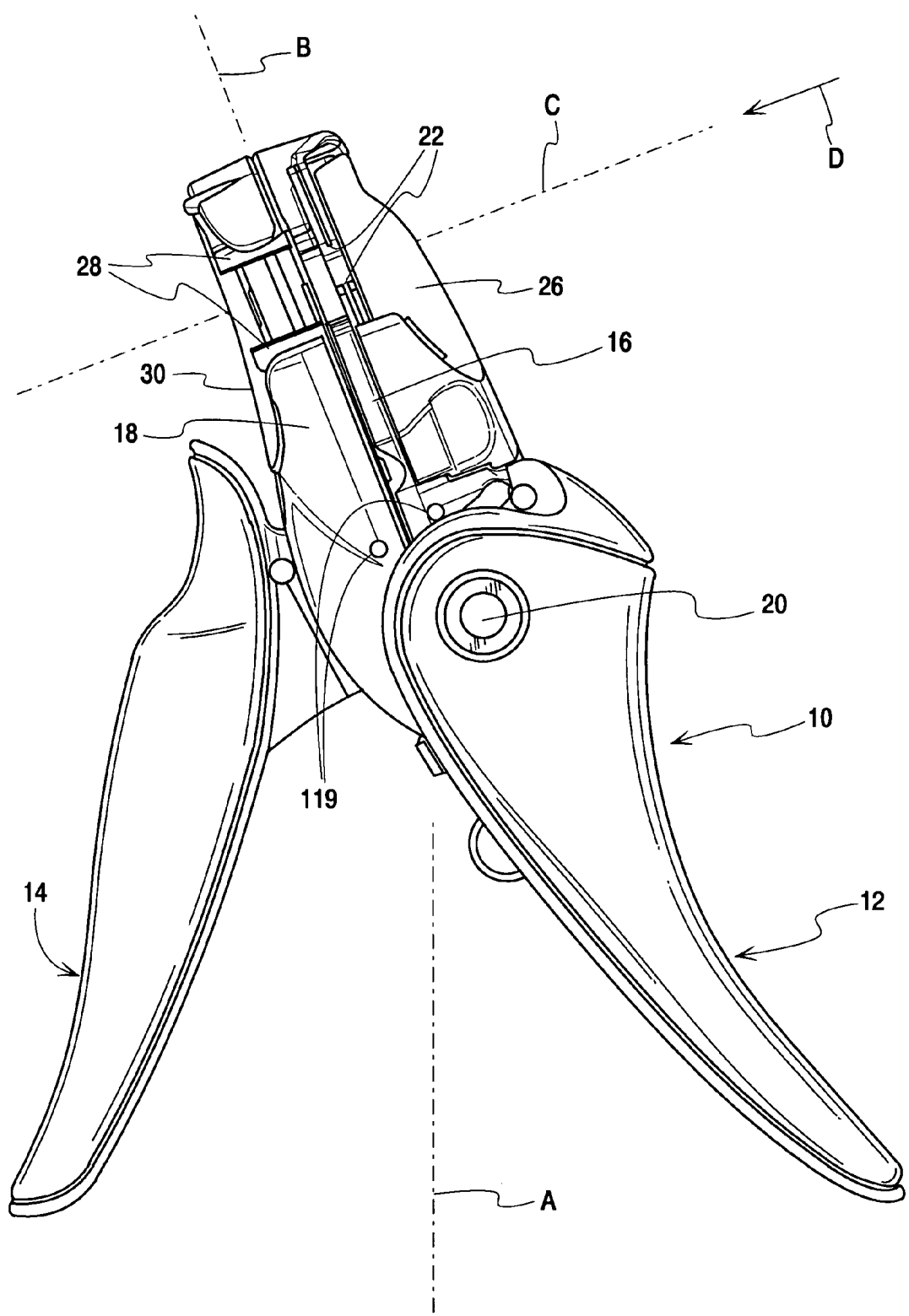
FIG. 1 is a front elevation view of the wire stripper of the present invention.

FIG. 1 illustrates the wire stripper 10 of the present invention. While the view of FIG. 1 is referred to herein as a front view of the wire stripper, it will be understood that this notation is somewhat arbitrary and is for reference purposes only. FIG. 1 is the view of the tool as it would normally be seen lying on a table but in a user's hand in the normal working position, the tool would be seen from the right side of FIG. 1. In the various views of this specification the front, side, rear and plan views of a part are referenced as the part would be oriented in the view of FIG. 1.

The major components of the wire stripper 10 include a blade handle 12, a gripper handle 14, a blade jaw 16 and a gripper jaw 18. All four of these components are pivotally connected to one another at a common pivot pin 20. A set of cutting blades 22 is mounted on the blade jaw 16 in a manner which will be described below. The blades are actuated by a link connected between one of the blades and the blade handle 12, as will be explained further below. A blade cover 26 is pivotally connected to the blade jaw and may carry an optional blade hold down spring (not shown in this view) which interacts with the cutting blades as will be described. A set of grippers 28 is mounted for movement on the gripper jaw 18 by means of a link (not shown) which is connected to the gripper handle. A gripper cover 30 fits over a portion of the set of grippers.

The blade handle and the gripper handle together define a centerline A between them. In FIG. 1 this line is generally vertical. The blade jaw 16 and the gripper jaw 18 contact each other along mating faces that define a separation line B. The jaws 16, 18 are arranged such that separation line B is angled with respect to the centerline A. Preferably this angle is about 158°. In other words, the jaws are angled about 22° from the vertical. This is done so that the throat (shown at line C) of the set of cutting blades 22, and thus the user's line of sight, are at an ergonomically advantageous angle. That is, when the user holds the wire stripper 10 in his or her hand with the forearm extending forwardly from the user's body and the wrist in a neutral position, the user's line of sight, indicated by arrow D, will be straight through the throat or loading area of the cutting blades. The user will not have to tilt, twist or cock his or her wrist to get a clear view of the feeding of a wire into the cutting area. Users can maintain a neutral wrist posture as they visually align the tool to the wire, thereby preventing repetitive stress injury.

Figure 2:
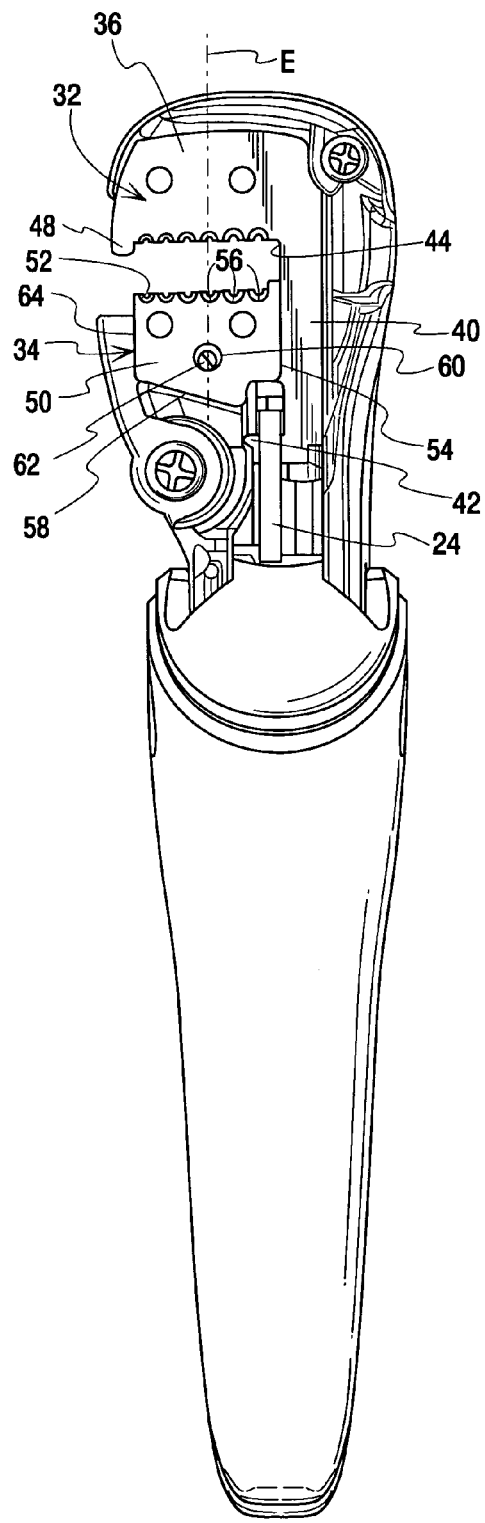
FIG. 2 is a side elevation view of the wire stripper looking at the cutting blades in an open position, with the blade cover and blade hold down spring removed to show the underlying blades.
Figure 3:
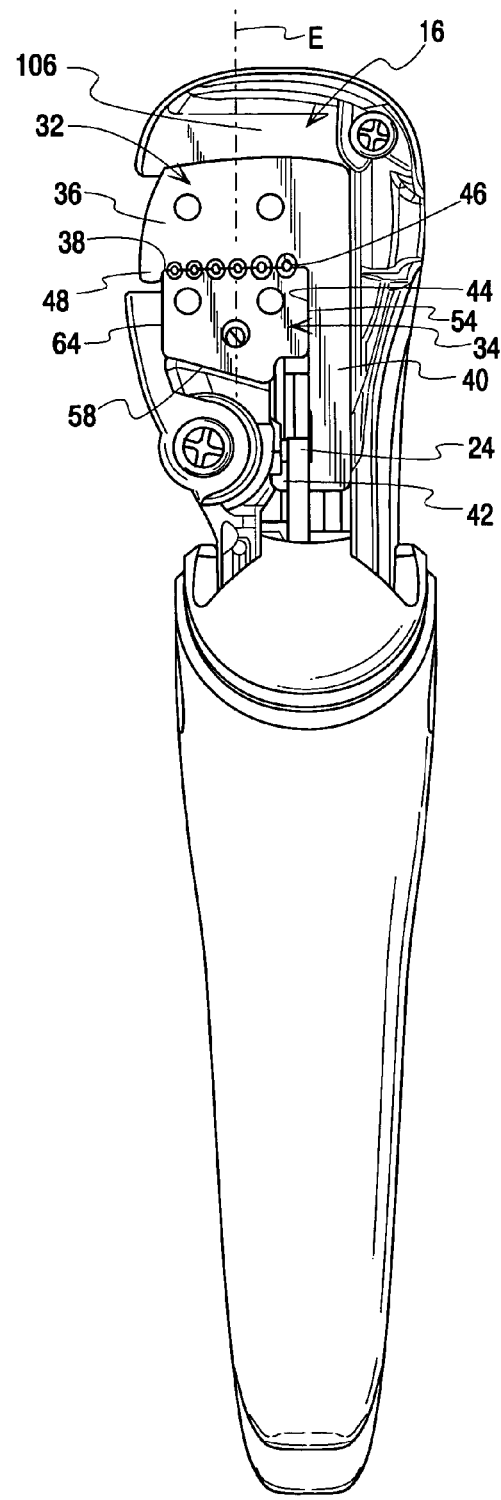
FIG. 3 is a view similar to FIG. 2 showing the cutting blades in a closed position.
Figure 4:
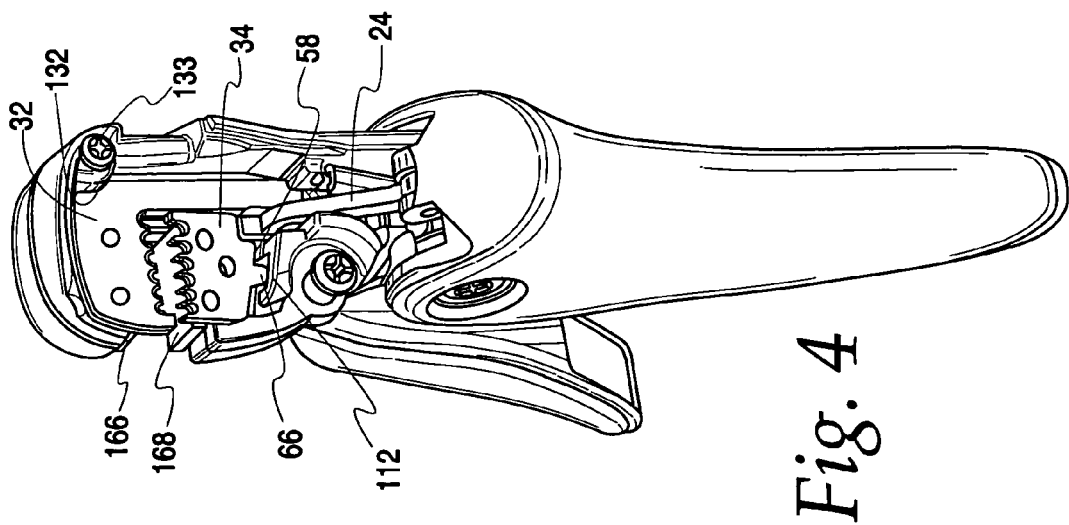
FIG. 4 is a perspective view of the wire stripper looking at the jaws with the blade cover and the blade hold down spring removed and the floating blade tab being inserted into its mounting pocket.
Figure 13:
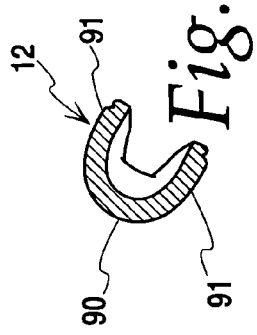
FIG. 13 is a section through the blade handle taken along line 13—13 of FIG. 10.

FIGS. 2–4 illustrate the set of cutting blades 22. The set includes a movable blade 32 and a floating blade 34. The movable blade 32 is mounted on the blade jaw 16 for reciprocating movement along a blade movement axis E. The movable 32 blade has a generally planar body 36 with a cutting edge 38 defined thereon. An elongated leg 40 extends from the body 36 and terminates at a foot 42. The foot extends through an opening in a link 24 to connect the movable blade 32 to the link. The leg 40 also has a gauge surface 44 on the side thereof closest to the cutting edge 38. The cutting edge has a plurality of generally semi-circular apertures 46 formed therein at controlled locations relative to the gauge surface 44. The end of the cutting edge opposite the leg 40 has a cam 48 extending longitudinally a short distance. The cam interacts with the floating blade as will be explained below. Further details of the cutting blades are shown and described in U.S. Pat. No. 6,439,084, the disclosure of which is incorporated herein by reference.

The floating blade 34 is mounted on the blade jaw for movement in a direction toward the leg's gauge surface 44. That is, the floating blade moves in a direction that includes a component toward the leg. The floating blade includes a generally planar body 50 with a cutting edge 52 defined thereon. The cutting edge 52 is in facing relation with the cutting edge 38 of the movable blade 32. The floating blade's body further includes a floating gauge surface 54 adjoining the cutting edge 52 and in facing relation with the gauge surface 44 of the leg. The cutting edge 52 has a plurality of generally semi-circular apertures 56 formed therein at controlled locations relative to the floating gauge surface 54. The floating blade further comprises a support edge 58 formed on the body 50 opposite the cutting edge 52. The support edge 58 forms an angle with the blade movement axis E which is other than 90°. In a preferred embodiment the angle of support edge 58 is about 15° above horizontal. A mounting hole 60 is formed in the floating blade's body 50. The mounting hole is engageable with a button 62 formed on the blade jaw. The mounting hole 60 has a size and shape that permits movement of the floating blade 34 toward and away from the gauge surface of the movable blade.

Between the support edge 58 and the cutting edge 52 the floating blade has a cam surface 64. This surface is engageable with the cam 48 during closure of the blades such that the cam urges the gauge surfaces 44 and 54 into engagement. That is, as seen in FIG. 3, when the movable blade 32 is drawn downwardly to a closed position, the cam 48 engages the cam surface 64 to urge the floating blade to the right. The engagement of the button 62 and mounting hole 60 permits slight movement of the floating blade to the right, i.e, toward the leg 40. The sloping support surface 58 also aids in bringing about the indicated small movement of the floating blade. The movable blade thus automatically corrects the position of the floating blade by forcing it toward the leg's gauge surface 44 at the rear of the tool every time a wire is stripped. When the gauge surfaces contact one another, alignment of the apertures 46 on the movable blade with the apertures 56 of the floating blade is assured.

Looking at FIG. 4, the body of the floating blade 34 further includes a tab 66 formed along its support surface 58. The tab is engageable with a pocket formed in a ledge on the blade jaw. The tab and ledge restrict movement of the floating blade to the plane of the floating blade. In other words, the tab prevents the floating blade from rotating out of its normal engagement with the mounting face 106 of the blade jaw 16.

Figure 5:
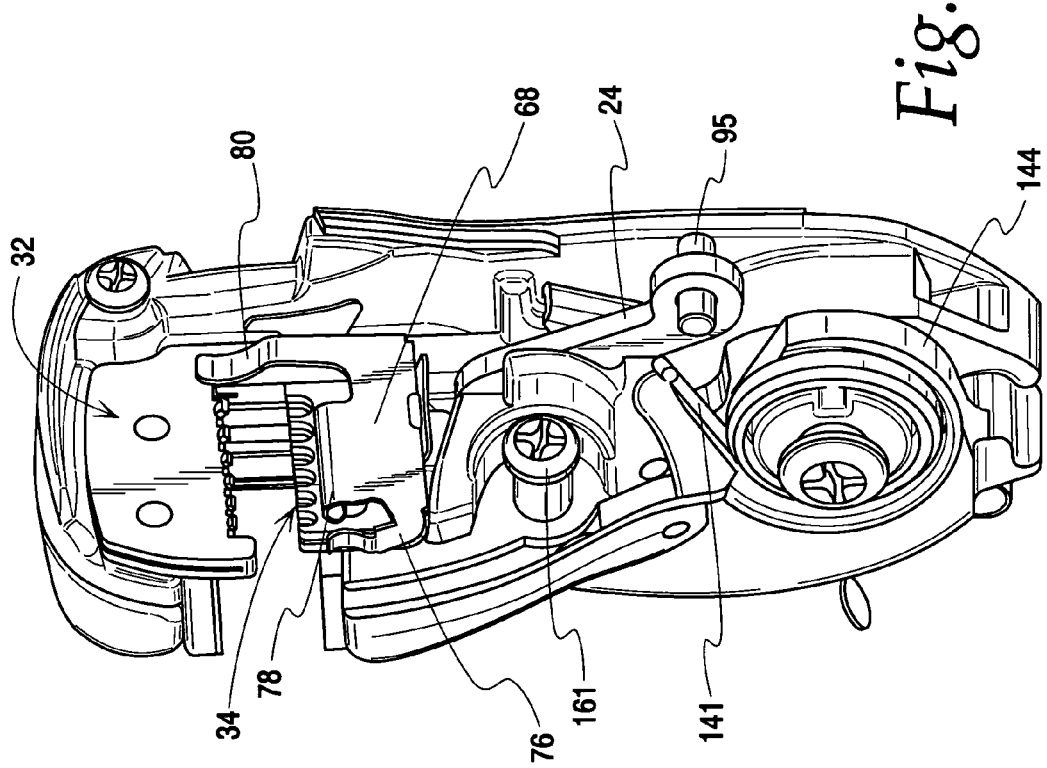
FIG. 5 is a perspective view of the jaws with the blade cover removed to show the blade hold down spring.

Turning now to FIGS. 5 and 45–48, an optional blade hold down spring 68 is shown. This spring may be provided to afford additional support for the blade set. The spring is mounted in the blade cover 26 to assist in aligning the cutting blades with one another by biasing the blades together. The blade hold down spring 68 includes a generally vertical body member 70 from which a base member 72 and a spacer 74 extend at right angles. The base 72 and spacer 74 are engageable with the interior ribs of the cover 26 to hold the spring 68 in the cover. A first prong 76 is formed at the left edge of the body 70. A second prong 78 extends across the top edge of the body. A third prong 80 protrudes upwardly from the right edge of the body. As seen in FIG. 5, the first prong 76 engages the cam surface 64 of the floating blade 34, urging the floating blade toward the leg of the movable blade, i.e., the first prong urges the gauge surfaces 44 and 54 toward one another. The second prong 78 engages the floating blade body 50, urging it against the mounting face 106 of the blade jaw 16. The third prong 80 engages the movable blade body 36, urging it against the mounting face 106 of the blade jaw. Together with the blade retention tabs on the blade jaw which will be described below, the use of the blade hold down spring 68 enhances the precision of the wire stripper in two ways. First, it provides pressure that constantly adjusts the alignment of the cutting blades. Second, it permits the deletion of fasteners, such as bolts or the like, that have been used in the past to mount the cutting blades on the blade jaw. Use of such fasteners detracts from accuracy because the location of the mounting holes in the jaws and the blades becomes critical to blade alignment but controlling the mounting hole locations is difficult at best. The present invention avoids these problems by using the hold down spring and blade retention tabs.

FIGS. 6–7 and 55–58 illustrate the two independent handle springs, a blade handle spring and a gripper handle spring. The blade handle spring 82 has a lower leg 83 in the form of a loop. The leg 83 joins a central coil 84. An upper arm 85 extends from the coil 84. As seen in FIG. 56, the end of the arm 85 engages the gripper jaw's lower wall 130 and the lower wall 130A. The leg 83 bears against a pad 90A formed on the interior of the blade handle 12. The blade handle spring 82 biases the blade handle outwardly, i.e., counterclockwise about the pivot 20 as seen in FIG. 1.

The gripper handle spring 86 has first and second arms 87 and 88 extending from a central coil 89. The arms have bent tips 87A and 88A. As seen in FIG. 58, the bent tip 88A engages the portion 156B of a lower wall in the gripper jaw 18. The bent tip 87A fits into a slot defined by webs 98A, 98B formed on the interior of the gripper handle 14. The gripper handle spring 86 biases the gripper handle outwardly, i.e., clockwise about the pivot 20 as seen in FIG. 1.

By providing individual springs for each handle, the present wire stripper eliminates the redundant force which an operator of prior strippers must overcome to separate the jaws and remove the insulation slug from the wires. In prior strippers a single handle spring is shared by the two handles. After the operator has squeezed the handles to close the grippers and cutting blades, the shared spring must be further compressed to separate the jaws. That is not the case with the independent springs of this invention. Further, the blade handle spring 82 has a smaller spring rate than the gripper handle spring 86. This assures proper sequencing of the cutting blades and grippers during a closing operation, namely, the blades will close first and then the grippers will follow.

Figure 11:
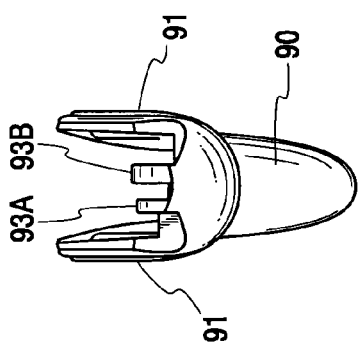
FIG. 11 is a top plan view of the blade handle.
Figure 10:
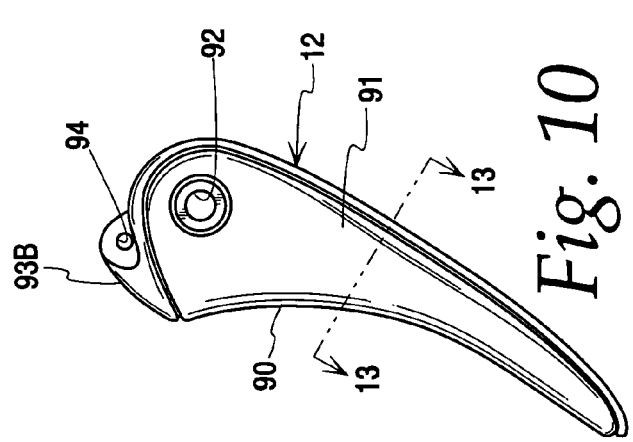
FIG. 10 is a rear elevation view of the blade handle.
Figure 9:
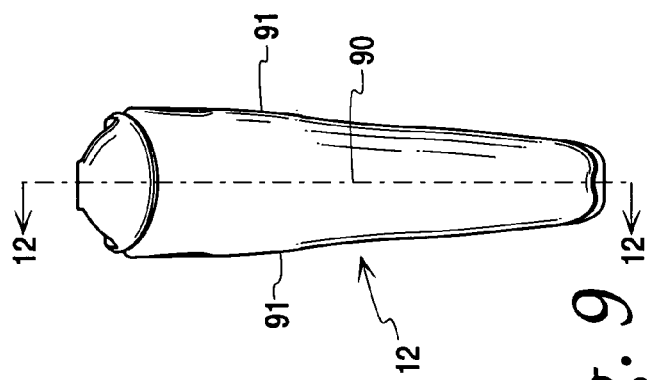
FIG. 9 is a side elevation view of the blade handle.
Figure 12:
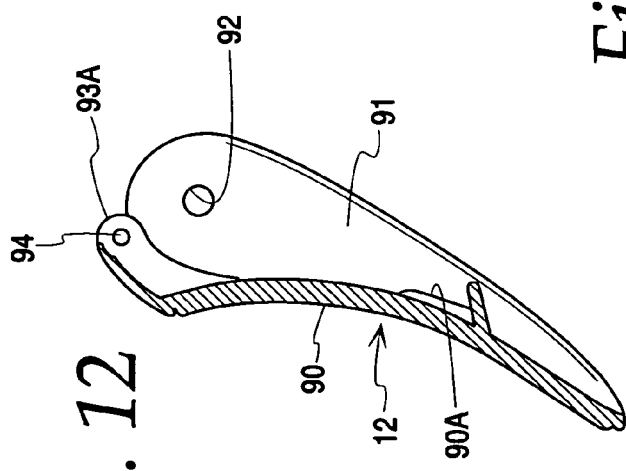
FIG. 12 is a section through the blade handle taken along line 12—12 of FIG. 9.

Details of the construction of the main components will now be described. Looking first at the blade handle 12 in FIGS. 9–13, it can be seen that the blade handle is a curved, elongated member of generally C-shaped cross section defined by a spine 90 and a pair of side walls 91. The spine includes a pad 90A (FIG. 12) against which the blade handle spring bears. Preferably the majority of the handle is overmolded with a relatively soft jacket that will cushion the palm and fingers of a user's hand. The side walls have aligned passages 92 through them for receiving the main pivot pin 20. Thus, the side walls form a first clevis. The first clevis receives a second clevis formed on the gripper jaw, as will be explained below. At the tops of the side walls there are front and rear ears 93A and 93B. It will be noted in FIG. 11 that the rear ear 93B is thicker and has a somewhat greater extent than the front ear 93A. This is because the rear ear 93B is used to kick over an overcenter latch during opening of the stripper, as will be described below. Aligned passages 94 extend through the ears for receiving a link pin 95 (FIG. 5). Thus, the ears 93A, 93B also form a link clevis which connects the link pin with the link 24 between the ears. This pivotally connects the lower end of the link 24 to the blade handle 12. The other end of the link receives the foot 42 of the movable blade as described above.

Figure 41:
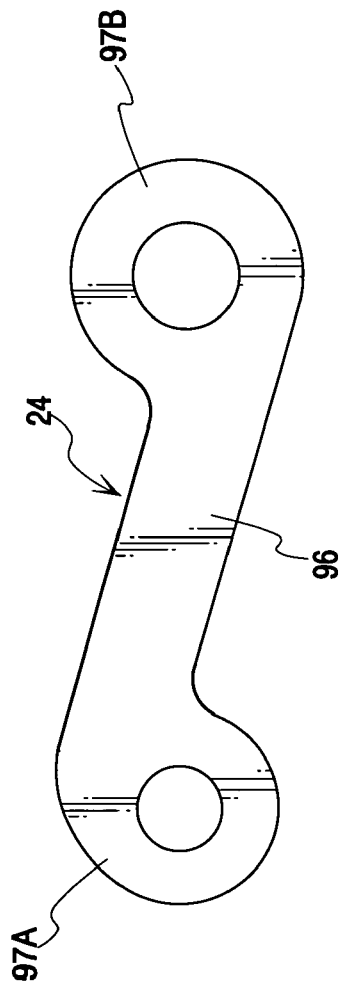
FIG. 41 is front elevation view of the link, on an enlarged scale.

The shape of the link 24 is shown in FIG. 41. It has an elongated arm 96 with integral bushings 97A at the top end and 97B at its lower end. Each bushing has an opening through it as shown. Bushing 97A receives the movable blade foot 42 while bushing 97B receives the link pin 95 at the ears of the blade handle 12.

The gripper handle 14 is shown in FIGS. 14–18. Similar to the blade handle, the gripper handle is a curved, elongated member of generally C-shaped cross section defined by a spine 98 and a pair of side walls 99. Again it is preferred that the majority of the gripper handle is overmolded with a relatively soft jacket that will cushion the hand. Front and rear upper walls 100A, 100B extend from the spine 98 and define a gap 101 (FIG. 16) between them. Passages 102 extend through the upper walls. A second link, similar to link 24, has a bushing that fits into the gap 101. A link pin (not shown) extends through the passages 102 and the bushing to pivotally connect the link to the gripper handle. The other end of the link connects to a foot on the movable gripper assembly. The upper walls 100A, 100B merge to form a nose 103. The nose has a bore 104 through it for receiving the main pivot pin 20. The nose also has first and second depressions 105A and 105B on its front face. The first depression receives a portion of the blade jaw clevis while the second depression receives a portion of the gripper jaw clevis, as will be explained below.

FIGS. 19–26 illustrate the blade jaw 16. The blade jaw has a main plate that extends generally in a vertical plane from the front of the wire stripper to the rear. The main plate defines a mounting face 106 and a mating face 108. A rear wall 110 extends generally transversely to the main plate. Features of the main plate's mounting face 106 include the ledge 112 that adjoins the support surface 58 of the floating blade. As indicated above the ledge forms an angle above horizontal of about 15°. As seen in FIG. 24 the ledge is spaced from the mounting face 106 to form a pocket 114. This pocket receives the floating blade tab 66 to retain the floating blade flush against the mounting face. The ledge 112 merges with an arcuate wall 115 that terminates at a lower block portion 116. The arcuate wall 115 surrounds a hole 113 where a mounting post (not shown) for the blade cover is secured. The lower block 116 is spaced from the rear wall 110 to form a channel 117 which receives the overcenter latch to be described below. There are aligned passages 118A in the lower block and 118B in the rear wall which receive one of the pins (the enlarged heads of which are shown at 119 in FIG. 1) for the overcenter latch.

Another feature of the mounting face 106 is the button 62 which engages the floating blade 34. As seen in the enlarged views of FIGS. 24 and 25, the button has a circular portion 120 and a flat side 121. This shape allows the floating blade to move laterally toward the rear of the blade jaw, but it cannot move upwardly with the movable blade. The flat side 121 provides clearance that allows the floating blade to swing or pivot into and out of place when inserting or removing the blade. Still another feature of the main plate is a slot 122 (FIG. 20) that provides clearance for passage of the bushing 97A of the moving blade link 24 as it moves up and down.

The rear wall 110 includes a retention tab 123. A similar retention tab 124 (FIGS. 22 and 23) is formed on the back side of the arcuate wall 115. The retention tabs and the mounting face 106 together define a channel 125 (FIG. 23) which receives the leg 40 and foot 42 of the movable blade 32. The retention tabs 123, 124 hold the movable blade against the mounting face 106, counteracting the tendency of the link 24 to pull the movable blade away from the mounting face. This eliminates the need for a heavy plate found in prior art strippers.

The rear face of the rear wall 110 has a recess 126 bounded by a curving lip 127 (FIG. 21). Near the bottom of the recess 126 is a bore 128A which is surrounded by an arcuate extension 129A. A lower wall 130 extends out of the plane of the rear wall 110 toward the front of the jaw. Wall 130 joins a plate 131 (FIG. 19) which is also connected to the bottom of the lower block 116. A second lower wall 130A (FIGS. 22, 26) is parallel to wall 130 and is spaced therefrom to define a gap which receives the blade handle spring 82. Wall 130A joins plate 131 and the rear wall 110. A bore 128B extends through plate 131 and is surrounded by an arcuate extension 129B. Bores 128A, 128B are aligned with one another, as are the arcuate extensions 129A, 129B. The bores receive the main pivot pin 20. The extensions and the lower wall 130 define a third clevis. The third clevis fits inside the second clevis of the gripper jaw as will be described. The third clevis also receives within it the nose 103 of the gripper handle 14. The arcuate extension 129B fits into the depression 105A of the nose.

The junction of the main plate and the rear wall on the mounting face 106 has an enlargement 132 (FIG. 20) through which a mounting hole 132A extends. The mounting hole receives a blade cover hold down screw 133 which is best seen in FIG. 4. Above the enlargement there is a cover 134 attached to the top edge of the main plate.

The gripper jaw 18 is illustrated in FIGS. 27–33. Like the blade jaw the gripper jaw has a main plate that generally lies in a vertical plane extending from the front to the back of the tool. The main plate has a mounting face 136 and a mating face 138. Attached to the rear edge of the main plate are a rear wall 140 and a rear web 142. The edge of the rear web is shaped to fit into the recess 126 in the rear wall of the blade jaw and abut the lip 127 when the jaws are closed. The rear web 142 also has a bore 143A. An extension 144 on the front edge of the main plate has a similar bore 143B formed in a boss 145. The bores 143A, 143B are aligned with one another and receive the main pivot pin 20. The rear web 142 and extension 144 define a second clevis. The second clevis receives within it the third clevis formed on the blade jaw.

The boss 145 has a notch 146 in it. The boss is surrounded by an annular groove 147. The notch and groove receive a torsion spring, a portion of which is shown at 141 in FIG. 5. One end of the torsion spring is held in the notch 146 while the other end engages the lower block 116 of the blade jaw to torsionally bias the jaws to a closed position.

The front edge of the main plate has a front web 148 which bounds the groove 147 and extends upwardly. The inside surface of the front web has an arcuate surface 155 (FIG. 32) which fits in the depression 105B of the nose 103. Just below surface 155 a lower wall extends from the front web 148 to the rear wall 140. The lower wall includes a top portion 156A and a bottom portion 156B. The top and bottom portions 156A, 156B are spaced apart vertically to define a gap between them that receives the gripper handle spring 86. Just above surface 155 a sleeve 149 (FIG. 30) extends between the front web 148 and the rear wall 140. A latch pin passage 150 extends through the front web 148, the sleeve 149 and the rear wall 140. Passage 150 receives a second latch pin, the head of which is seen at 119 in FIG. 1. A slot 151 (FIG. 28) in the mating face 138 of the main plate provides the overcenter latch access to the interior of the sleeve where the latch is pivotally connected to the latch pin.

Just above the sleeve 149 the rear wall 140 has a retention tab 152 (FIG. 31). The inside of the front web has a second retention tab 153. Similarly to tabs 123, 125, the retention tabs 152, 153 hold the movable gripper against the mounting face 136 of the gripper jaw. Between the tabs 152, 153 there is a slot 154 (FIG. 30) in the main plate whose function is the same as slot 122, namely, to provide clearance for the bushing of the link that connects the movable gripper to the gripper handle.

The remaining features of the gripper jaw include a pair of mounting holes. Hole 157 receives a screw for fastening the stationary gripper and the gripper cover 30. Hole 158 receives a screw for retaining the gripper cover 30. A flange 159 extends over the top of the main plate. A guide wall 160 on the mounting surface positions the movable gripper.

Turning now to FIGS. 34–35, details of the blade cover 26 are shown. The blade cover includes a boss 162 which fits over a post (not shown) extending from the hole 113 in the blade jaw. A screw 161 (FIG. 5) fits into the boss and the post to pivotally mount the cover. The cover has a catch 163 in its upper right corner which is releasably engageable with an edge of the blade jaw rear wall 110. The rear wall may have a small ramp and indentation for receiving the catch. A retaining screw 133 (FIG. 4) is used to prevent the catch from inadvertently popping off the rear wall 110. The screw 133 does not have to act through friction. The interference between the catch 163 and the rear wall insures that the cover is restrained against accidental opening when the tool is dropped or jostled. Screw 133 simply restricts motion, preventing the catch from jumping its engagement with the rear wall of the blade jaw. Yet when the cutting blades need to be changed, loosening of screw 133 and releasing the catch 163 is all that is needed to permit the cover to be rotated out of the way for removing both the floating blade 34 and the movable blade 32. The user no longer needs to remove any fasteners to change blades, which is an improvement over the prior art. It can be seen in FIG. 35 that a plurality of strengthening ribs are formed on the inside surface of the cover 26. Some of these interact with the blade hold down spring 68 to hold the spring in place.

FIG. 36 shows the gripper cover 30. It has a mounting screw opening 164 through which a mounting screw (not shown) passes for connection with the mounting hole 157. It also has a notch 159 for engagement with a screw anchored in mounting hole 158. Both the blade cover and the gripper cover protect the connections between the links and the movable blade or gripper.

Figure 40:
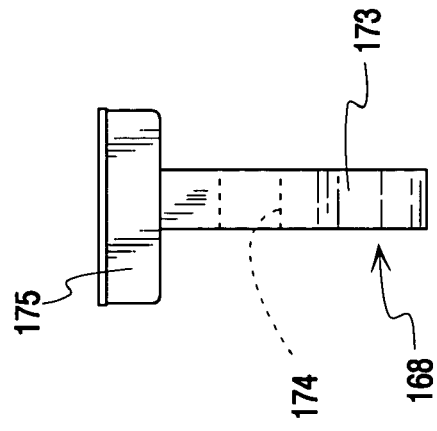
FIG. 40 is a front elevation view of the stationary gripper assembly.
Figure 39:
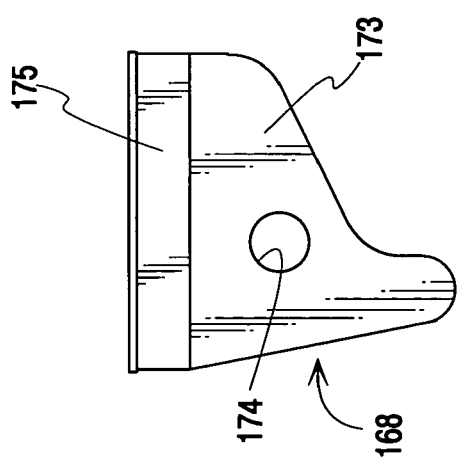
FIG. 39 is a side elevation view of the stationary gripper assembly.

FIGS. 37–40 show the set of grippers 28. There is a movable gripper 166 (FIGS. 37–38) and a stationary gripper 168 (FIGS. 39–40). The movable gripper has a plate that includes a body 169, a leg 170 and foot 171. Attached underneath the body is a pad 172. The foot 171 is engaged by the upper bushing of a connecting link (not shown but similar to link 24). The lower bushing of this link fits in the gap 101 between the upper walls 100A, 100B of the gripper handle and is pinned to those walls by a link pin extending through passages 102. The stationary gripper 168 has a plate 173 with a mounting hole 174 for screw attachment to gripper jaw mounting hole 157. The upper edge of the plate has a pad 175.

FIGS. 42–44 illustrate the overcenter latch assembly 176. It includes a gripper side latch member 178, a blade side latch member 180 and a rivet 182 pivotally connecting them. The gripper side latch member 178 is a plate having a central opening for the rivet and a second opening 184 for a latch pin. As mentioned above, the heads of the latch pins are visible at 119 in FIG. 1. The latch pin 119 extends through the latch pin passage 150 to pivotally connect the latch member 178 to the gripper jaw 18. The latch member 178 fits into the slot 151 to align opening 184 with passage 150. The gripper side latch member also has an abutment 186 on its lower side. The gripper side latch member 178 fits in between the upstanding legs 188A, 188B of the U-shaped blade side latch member 180. These legs are joined by a bottom wall 190. The legs have aligned openings that receive the rivet 182 to pivotally connect the latch members. There is a second set of aligned openings 192 that receive a latch pin 119. This pin goes through the link pin passages 118 in the blade jaw 16 to pivotally attach latch member 180 to the blade jaw. The latch member 180 resides largely in the channel 117 in the blade jaw. The latch member 180 has an extension 194. The bottom wall 190 of the extension is in the same plane as the rear ear 93B on the blade handle 12 and under certain circumstances the rear ear 93B will contact the extension's bottom wall, as explained below.

The use, operation and function of the wire stripper are as follows. The user holds the wire stripper 10 in the palm of his or her hand with the thumb wrapped around the blade handle 12 and the fingers wrapped around the gripper handle 14. The user's free hand will guide a wire to be stripped into the throat C of the blades and align it with the appropriately-sized cutting aperture 56 of the floating blade. Due to the angled jaws this can be done with the wrist in a neutral position. Then the user begins to squeeze the handles together and the following actions take place. As the compression on the handles begins to increase the blade handle spring 82 is the first to yield. The blade handle pivots about the main pivot pin 20, causing the link 24 to start pulling the movable cutting blade 32 downwardly. The retention tabs 123, 124 keep the movable blade flush against the mounting surface 106 as the link pulls down on the blade. The cutting apertures 46 of the movable blade close on the wire and cut the insulation. Some time after the movable blade has begun to move (but not necessarily after the movable blade fully closes on the wire) the gripper handle spring 86 yields, and the gripper handle starts to pivot. This causes the link to pull the movable gripper 166 down toward the stationary gripper 168. The grippers close on the wire after the cutting blades close and cut the insulation.

Once the grippers and blades reach the full extent of their available downward movement, continued pressure on the handles causes the torsion spring 141 to yield, thereby allowing the jaws 16 and 18 to pivot about the main pivot pin and causing the mating faces 108 and 138 to move away from one another. With the grippers and cutting blades already closed, the relative pivoting of the jaws causes the slug of insulation to be pulled off of the end of the wire. FIG. 8 illustrates how offsetting the main pivot pin 20 from the mating faces 108, 138 reduces the deviation from a straight slug removal path. That is, since the jaws pivot there is inevitably an arcuate component to their relative movement. A purely straight movement, in the direction of the wire's axis, would be the geometric ideal but achieving a purely straight movement significantly complicates the mechanism. The present invention provides an optimal accommodation of simplicity and accuracy by moving the pivot point toward the blade jaw in relation to the mating faces of the jaws. This increases the straightness of the strip that the tool provides. By way of example only, in typically sized jaws in their fully open condition the deviation from a straight path in the present invention is reduced from about 0.124 inches to about 0.054 inches.

As the jaws open the overcenter latch assembly 176 is moved by the blade handle spring 86 to a set or locked condition. The set condition arises when the center rivet 182 is pushed above the centerline between the openings 184, 192. Further rotation of the latch members is prevented by engagement of the abutment 186 with the bottom wall 190. Thus, when the user releases pressure on the handles 12, 14 the torsion spring acting on the jaws 16, 18 is unable to close the jaws immediately because the latch assembly is set. Instead the handle springs begin to push the handles out and cause the movable blade and the movable gripper to open before the jaws close. As the blade handle pivots counterclockwise about the main pivot (as seen in FIG. 1) its rear ear 93B engages the bottom wall 190 of the extension 194 on the overcenter latch member 180. The rear ear 93B pushes the extension upwardly, causing the rivet 182 to move downwardly. This kicks the latch assembly through center, i.e., it moves the rivet below the centerline between the openings 184, 192. This releases the set condition of the latch assembly and allows the torsion spring 141 to return the jaws 16, 18 to their normal, closed position in which the mating faces 108 and 138 adjoin one another. The tool is then ready for the next operating cycle.

Figures 51, 52, 53, 54:
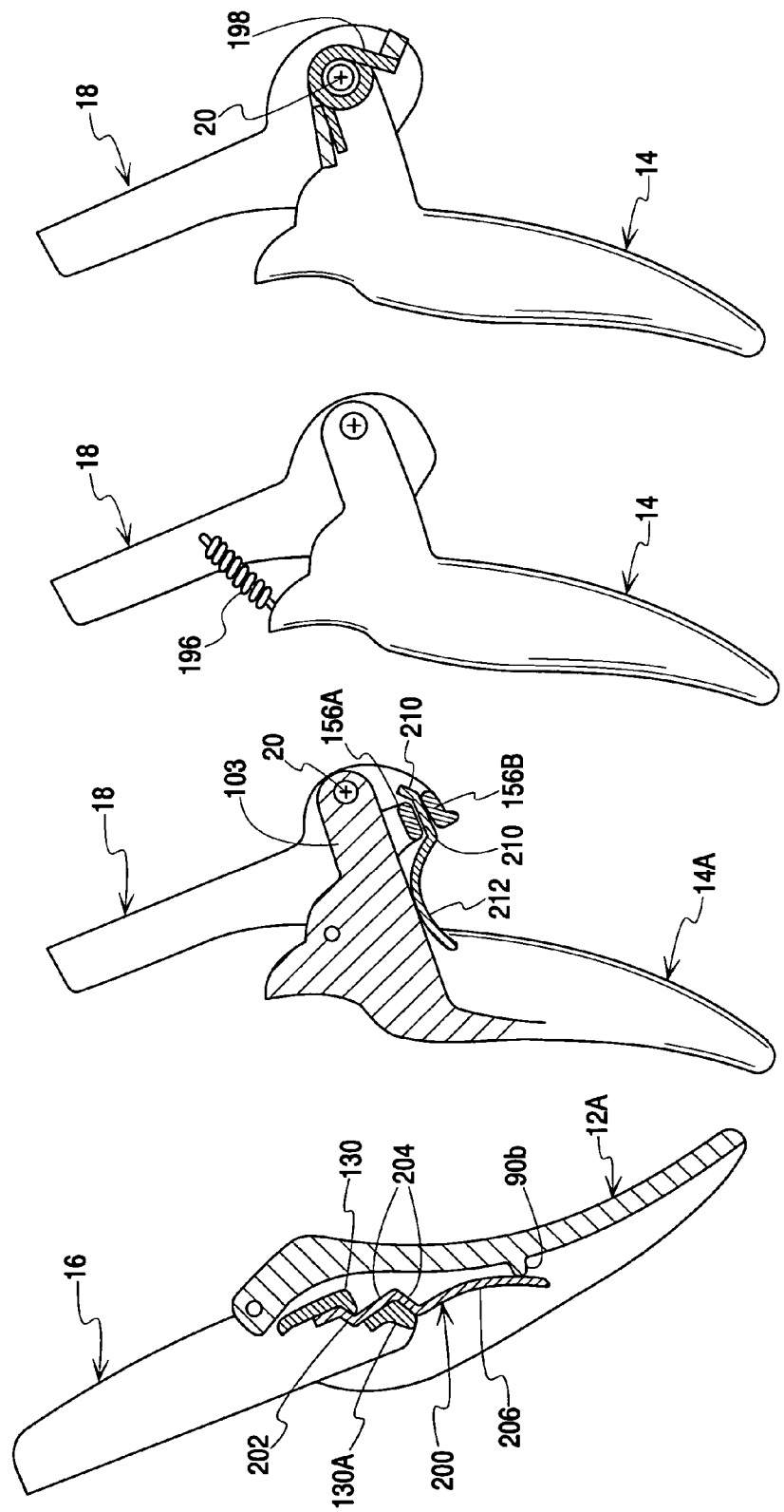
FIG. 51 is a diagrammatic section through the blade handle, the blade jaw, and the blade handle spring of FIG. 49, illustrating the interrelationship of these parts.
FIG. 52 is a diagrammatic section through the gripper handle, the gripper jaw, and the gripper handle spring of FIG. 50, illustrating the interrelationship of these parts.
FIG. 53 is diagrammatic front elevation view of the gripper handle and gripper jaw, illustrating an alternate embodiment of a gripper spring.
FIG. 54 is diagrammatic front elevation view of the gripper handle and gripper jaw, illustrating a further alternate embodiment of a gripper spring.

FIGS. 53 and 54 show two possible alternate configurations of the handle springs. A coil spring could be placed between the handle and jaw. An example is spring 196 as shown in FIG. 53. Or a torsion spring as shown at 198 in FIG. 54 could be used to bias the handle and jaw apart.

FIGS. 49–52 illustrate further alternate embodiments of the two independent handle springs, a blade handle spring 200 and a gripper handle spring 208. These springs require minor alterations to the interiors of the blade handle and gripper handle. The modified handles are shown at 12A and 14A. The blade handle spring 200 has outer and inner angled segments 202 and 204 and an arcuate end portion 206. As seen in FIG. 51, the outer angled segments 202 engage the gripper jaw's lower wall 130 while the inner angled segments 204 engage the lower wall 130A. The arcuate end portion 206 bears against a fulcrum 90B formed on the interior of the blade handle 12. The blade handle spring 200 biases the blade handle outwardly, i.e., counterclockwise about the pivot 20 as seen in FIG. 1.

The gripper handle spring 208 has angled segments 210 and an arcuate portion 212. As seen in FIG. 52, the angled segments engage the top and bottom portions 156A, 156B of a lower wall in the gripper jaw 18. The arcuate portion 212 bears against the underside of the nose 103 of the gripper handle 14. The webs 98A, 98B are removed in this embodiment. The gripper handle spring 208 biases the gripper handle outwardly, i.e., clockwise about the pivot 20 as seen in FIG. 1.

While the preferred form of the invention has been shown and described herein, it should be realized that there may be many modifications, substitutions and alterations thereto. For example, the apertures in the cutting edges of the blades are shown with all different sizes. One or more of the apertures could have the same size so two wires of the same size could be stripped at once.

We claim:

1. A set of cutting blades for use in a wire stripper of the type having a pair of jaws, the cutting blades being mounted on at least one of the jaws for movement relative to one another along a blade movement axis, the set of cutting blades including:

a movable blade mountable on one of the jaws for reciprocating movement along the blade movement axis, the movable blade having a body with a cutting edge defined thereon and a leg extending therefrom beyond the cutting edge, the leg having a gauge surface on a side thereof closest to the cutting edge, the cutting edge having a plurality of apertures formed therein at controlled locations relative to the gauge surface; and a floating blade mountable on said one of the jaws for movement in a direction toward the leg's gauge surface, the floating blade having a body with a cutting edge defined thereon which is in facing relation with the cutting edge of the movable blade, the floating blade's body further including a floating gauge surface adjoining the cutting edge and in facing relation with the gauge surface of the leg, the cutting edge having a plurality of apertures formed therein at controlled locations relative to the floating gauge surface, movement of the floating blade toward the leg causing the gauge surfaces of the blades to engage one another and thereby assure alignment of the apertures on the respective cutting edges.

2. The set of blades of claim 1 wherein the floating blade further comprises a support edge formed on the body opposite the cutting edge, the support edge forming an angle with the blade movement axis which is other than ninety degrees.

3. The set of blades of claim 1 wherein the movable blade further comprises a cam formed on the body and extending beyond the cutting edge and wherein the floating blade further comprises a cam surface opposite the floating gauge surface and engageable with the cam during closure of the blades such that the cam urges the gauge surfaces into engagement.

4. The set of blades of claim 1 wherein the leg extends in a direction generally parallel to the blade movement axis and the floating blade is mounted for movement that includes a component generally perpendicular to the blade movement axis.

5. The set of blades of claim 1 further comprising a mounting hole in the body of the floating blade, the hole being engageable with a button formed on said one jaw, the hole having a size and shape that permits movement of the floating blade toward and away from the gauge surface of the movable blade.

6. The set of blades of claim 1 wherein the body of the floating blade is generally planar and further comprises a tab formed thereon, the tab being engageable with a ledge on said one jaw such that movement of the floating blade is restricted to the plane of the floating blade.

7. In a wire stripper of the type having a pair of jaws and first and second cutting blades each having a cutting edge, the blades being mounted on at least one of the jaws for movement relative to one another along a blade movement axis, the improvement comprising a support edge formed on at least one of the blades opposite its cutting edge, the support edge forming an angle with the blade movement axis which is other than ninety degrees.

8. In a wire stripper of the type having a pair of jaws and first and second generally planar cutting blades, each blade having a cutting edge, the blades being mounted on at least one of the jaws for movement relative to one another along a blade movement axis, the improvement comprising a tab formed on at least one of the blades, the tab being engageable with a ledge on said at least one jaw such that movement of said at least one blade is restricted to movement in the plane of said blade.

9. A wire stripper having a pair of jaws and first and second cutting blades each having a cutting edge, the blades being mounted on at least one of the jaws for movement relative to one another along a blade movement axis, a support edge formed on at least one of the blades opposite its cutting edge, the support edge forming an angle with the blade movement axis which is other than ninety degrees, and a ledge formed on said one jaw, the ledge having a support surface parallel to the support edge of the blade.

10. A wire stripper having a pair of jaws and first and second generally planar cutting blades, each blade having a cutting edge, the blades being mounted on at least one of the jaws for movement relative to one another along a blade movement axis, a tab formed on at least one of the blades, a ledge formed on said at least one jaw and having a pocket formed therein, the tab being insertable into the pocket and engageable with the ledge such that movement of said at least one blade is restricted to movement in the plane of said blade.

11. The wire stripper of claim 10 wherein said at least one blade further comprises a support edge formed opposite its cutting edge, the support edge forming an angle with the blade movement axis which is other than ninety degrees, and the ledge further comprises a support surface parallel to the support edge of the blade.

12. The wire stripper of claim 11 wherein the support surface forms an angle of about 75° with the blade movement axis.

13. A wire stripper having a set of cutting blades and a pair of jaws, the cutting blades being mounted on at least one of the jaws for movement relative to one another along a blade movement axis, said one jaw having a button thereon and the set of cutting blades including a floating blade having a body with a hole therein adapted for receiving the button, the button and hole being shaped such that the floating blade is mounted for movement in a direction that includes a component generally perpendicular to the blade movement axis.

14. The wire stripper of claim 13 wherein the perimeter of the button has a circular portion and a flat portion, the flat portion being angled from the blade movement axis.

15. The wire stripper of claim 14 wherein the hole in the floating blade is generally circular.

16. The wire stripper of claim 13 further comprising a tab formed on the floating blade, a ledge formed on said at least one jaw and having a pocket formed therein, the tab being insertable into the pocket and engageable with the ledge such that movement of the floating blade is restricted to movement in the plane of said blade.

17. A wire stripper comprising a pair of jaws, a set of cutting blades mounted on at least one of the jaws for movement relative to one another along a blade movement axis, and a blade hold down spring connected to said one of the jaws, the set of cutting blades including a movable blade and a floating blade, each blade having a gauge surface formed thereon, the gauge surfaces being arranged in facing relation to one another, the cutting blades further each having apertures on a cutting edge that are aligned when the gauge surfaces are in contact with one another, the floating blade being mounted for movement toward the gauge surface of the movable blade and the blade hold down spring being arranged to bias the floating blade toward the movable blade.

18. The wire stripper of claim 17 further characterized in that the movable blade has a generally planar body and a leg extending therefrom beyond the cutting edge, the leg having the movable blade's gauge surface on a side thereof closest to the cutting edge, and the floating blade is mountable on said one of the jaws for movement in a direction toward the leg's gauge surface, the floating blade having a generally planar body with a cutting edge defined thereon which is in facing relation with the cutting edge of the movable blade, the body having the floating blades' gauge surface adjoining the cutting edge and in facing relation with the gauge surface of the leg.

19. The wire stripper of claim 18 wherein the blade hold down spring has a prong engageable with the floating blade body and biasing said body in a direction parallel to the plane of the body.

20. The wire stripper of claim 18 wherein the blade hold down spring has a prong engageable with the floating blade body and biasing said body in a direction perpendicular to the plane of the body.

21. The wire stripper of claim 18 wherein the blade hold down spring has a prong engageable with the movable blade body and biasing said body in a direction perpendicular to the plane of the body.

22. The wire stripper of claim 18 wherein the blade hold down spring has a first prong engageable with the floating blade body and biasing said body in a direction parallel to the plane of the body, a second prong engageable with the floating blade body and biasing said body in a direction perpendicular to the plane of the body, and a third prong engageable with the movable blade body and biasing said body in a direction perpendicular to the plane of the body.

23. The wire stripper of claim 17 further comprising a blade hold down cover pivotally attached to said one jaw, the blade hold down spring being mounted in the blade hold down cover.

24. The wire stripper of claim 23 wherein the blade hold down cover includes a projection and said one jaw has a catch engageable with the projection to retain the blade hold down cover in a closed position.

25. The wire stripper of claim 24 further comprising a fastener movably attached to said one jaw and engageable with the blade hold down cover to prevent the projection from inadvertently releasing from the catch.

26. A wire stripper having a set of cutting blades and a pair of jaws, the cutting blades being mounted on at least one of the jaws for movement relative to one another along a blade movement axis, the jaws each having a mating face engageable with one another along a separation line, the jaws being pivotally joined together at a pivot pin the center of which is laterally spaced from the separation line.

27. The wire stripper of claim 26 wherein the pivot pin is laterally spaced from the separation line in the direction of said one of the jaws that mounts the cutting blades.

28. The wire stripper of claim 26 wherein the set of cutting blades includes a movable blade and a floating blade, each blade having a gauge surface formed thereon, the gauge surfaces being arranged in facing relation to one another, the cutting blades further each having apertures on a cutting edge that are aligned when the gauge surfaces are in contact with one another, the floating blade being mounted for movement toward the gauge surface of the movable blade.

29. A wire stripper having a set of cutting blades, first and second jaws, first and second handles, and first and second handle springs, the cutting blades being mounted on at least one of the jaws for movement relative to one another along a blade movement axis, the jaws being pivotally joined together at a pivot pin, the first and second handles being pivotally connected to the first and second jaws, respectively, with the first spring engageable between the first handle and the first jaw and the second spring engageable between the second handle and the second jaw.

30. The wire stripper of claim 29 wherein the first and second springs have differential spring rates.

31. A wire stripper having a set of cutting blades, first and second jaws, first and second handles, the cutting blades being mounted on at least one of the jaws for movement relative to one another along a blade movement axis, the jaws being pivotally joined together at a pivot pin, the first and second handles being pivotally connected to the first and second jaws, respectively, the handles defining a centerline between them, the jaws each having a mating face engageable with one another along a separation line, the separation line being angled with respect to the centerline.

32. The wire stripper of claim 31 wherein the angle between the separation line and the centerline is about 155° to about 160°.

33. A wire stripper having cutting blades mounted on first and second jaws, the cutting blades defining a throat between them, first and second handles connected to the jaws for manipulating the jaws, the jaws being oriented with respect to the handles such that when the handles are held by a user in a neutral wrist position with the forearm extended, the throat of the blades is generally aligned with the user's line of sight.

34. The wire stripper of claim 33 wherein the handles define a centerline between them and the jaws each having a mating face engageable with one another along a separation line, and wherein the angle between the separation line and the centerline is about 155° to about 160°.

35. The wire stripper of claim 34 wherein the cutting blades include a movable blade and a floating blade mounted on at least one of the jaws for movement relative to one another along a blade movement axis, said one jaw having a mounting face opposite its mating face for mounting the movable blade.

36. The wire stripper of claim 35 further comprising at least one tab on said one jaw spaced from the mounting face with a portion of the movable blade trapped between the tab and the mounting face.

37. A wire stripper comprising a blade jaw having a mounting surface, a gripper jaw, a set of cutting blades mounted on the blade jaw for movement relative to one another along a blade movement axis, the set of cutting blades including a movable blade and a floating blade, the movable blade engaging the mounting surface of the blade jaw, and at least one retention tab formed on the blade jaw spaced from the blade jaw's mounting surface and trapping a portion of the movable blade between it and the blade jaw's mounting surface.

38. The wire stripper of claim 37 wherein the movable blade has a body with a cutting edge defined thereon and a leg extending therefrom beyond the cutting edge, the leg extending between the mounting surface of the blade jaw and the tab.

39. The wire stripper of claim 37 wherein the gripper jaw has a mounting surface and further comprising a set of grippers mounted on the gripper jaw mounting surface for movement relative to one another along a gripper movement axis, the set of grippers including a movable gripper and a stationary gripper, and at least one retention tab formed on the gripper jaw spaced from the gripper jaw's mounting surface and trapping a portion of the movable gripper between it and the gripper jaw's mounting surface.

* * * * *